United States Patent
Kobari (10) Patent No.: US 11,276,374 B2
(45) Date of Patent: Mar. 15, 2022

(54) DRAWING DEVICE, DRAWING PROGRAM, AND NON-TRANSITORY COMPUTER-READABLE STORAGE MEDIUM FOR EDITING AND MANAGING ASSOCIATIONS BETWEEN OBJECT, SCREEN, AND PROJECT SCRIPTS

(71) Applicant: Mitsubishi Electric Corporation, Tokyo (JP)

(72) Inventor: Ryu Kobari, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/040,545

(22) PCT Filed: Mar. 30, 2018

(86) PCT No.: PCT/JP2018/013843
§ 371 (c)(1),
(2) Date: Sep. 23, 2020

(87) PCT Pub. No.: WO2019/187087
PCT Pub. Date: Oct. 3, 2019

(65) Prior Publication Data
US 2021/0043168 A1 Feb. 11, 2021

(51) Int. Cl.
*G09G 5/36* (2006.01)
*G06F 3/0482* (2013.01)
*G06F 3/0484* (2022.01)

(52) U.S. Cl.
CPC .......... *G09G 5/363* (2013.01); *G06F 3/0482* (2013.01); *G06F 3/0484* (2013.01)

(58) Field of Classification Search
None
See application file for complete search history.

(56) References Cited

U.S. PATENT DOCUMENTS 5,651,108 A * 7/1997 Cain .................. G06F 8/34
715/763
7,603,183 B1 * 10/2009 Munemoto ............ G05B 19/05
700/17

(Continued)

FOREIGN PATENT DOCUMENTS

JP 2002-268737 A 9/2002

OTHER PUBLICATIONS

International Search Report and Written Opinion dated Jun. 26, 2018 for PCT/JP2018/013843 filed on Mar. 30, 2018, 9 pages including English Translation of the International Search Report.

*Primary Examiner* — Patrick F Valdez
(74) *Attorney, Agent, or Firm* — Xsensus LLP (57) ABSTRACT

A drawing device includes: a display unit that displays an editing screen for creating a plurality of screens to be displayed on a programmable display device; a screen data generation unit that generates screen data configured by the plurality of screens and including an object that is a display element arranged on the editing screen; a screen script generation unit that generates a screen script that is a processing program to be executed only when a specific screen out of the plurality of screens to be displayed on the programmable display device is displayed; and an association management unit that manages an association between the object and the screen script. When the object is copied from a source editing screen to a destination editing screen, the screen script generation unit registers, with the destination editing screen, the screen script associated with the object to be copied.

14 Claims, 8 Drawing Sheets

(56) References Cited

U.S. PATENT DOCUMENTS

2004/0153804 A1* 8/2004 Blevins .............. G05B 19/0428
  714/33
2007/0132779 A1* 6/2007 Gilbert ............. G05B 19/41885
  345/619
2010/0235767 A1* 9/2010 Hammack ............. G06T 3/0012
  715/763
2019/0102072 A1* 4/2019 Strinden ................ G06F 3/0483

* cited by examiner

DRAWING DEVICE, DRAWING PROGRAM, AND NON-TRANSITORY COMPUTER-READABLE STORAGE MEDIUM FOR EDITING AND MANAGING ASSOCIATIONS BETWEEN OBJECT, SCREEN, AND PROJECT SCRIPTS

CROSS-REFERENCE TO RELATED APPLICATIONS

The present application is based on PCT filing PCT/JP2018/013843, filed Mar. 30, 2018, the entire contents of which are incorporated herein by reference.

FIELD

The present invention relates to a drawing device, a drawing program, and a storage medium for creating a screen that is displayed by a programmable display device.

BACKGROUND

A programmable display device displays, on a monitor screen, the state of an external instrument connected to the programmable display device, and operates the external instrument according to an input operation. A drawing device generates screen data indicating the contents of a screen that is displayed on the monitor screen based on the arrangement of objects on an editing screen displayed on the drawing device. An object is a display element arranged on an editing screen. The drawing device also generates object scripts and screen scripts. An object script is attribute information of an object and is also a processing program for executing a function set for the object. A screen script describes processing for a unit of a single screen that is displayed on the monitor screen.

Patent Literature 1 relates to a graphic operation panel capable of creating an operation panel for any display screen using drawing software, and discloses that a screen script which is an operation program accompanying a screen can be registered with display screen data for displaying a display screen.

CITATION LIST

Patent Literature

Patent Literature 1: Japanese Patent Application Laid-open No. 2002-268737

SUMMARY

Technical Problem

In the drawing device, an object arranged on one editing screen can be copied to another editing screen, so that the trouble of creating the same object for each editing screen can be saved. Because the object is accompanied by an object script, the object script can be automatically copied when the object is copied, so that the trouble of creating the same object script for each editing screen can be saved. However, because the object is not accompanied by the screen script described above, the user performs the work of generating, on an editing screen that is a screen to which the object is copied (hereinafter, referred to as "destination editing screen"), the screen script identical to the screen script generated for another editing screen that is a screen from which the object is copied (hereinafter, referred to as "source editing screen"), separately from the work of copying the object.

In the technique of Patent Literature 1, because the association between objects and screen scripts is not managed, when a screen script is copied together with an object, the work of creating the same screen script for each editing screen is required. For this reason, it is difficult for the technique of Patent Literature 1, in which the association between objects and screen scripts is not managed, to improve the work efficiency for creating a plurality of screens that is displayed on a programmable display device.

The present invention has been made in view of the above, and an object thereof is to obtain a drawing device capable of improving the work efficiency for creating a plurality of screens that is displayed on a programmable display device.

Solution to Problem

A drawing device according to an aspect of the present invention includes: a display unit to display an editing screen for creating a plurality of screens to be displayed on a programmable display device; a screen data generation unit to generate screen data configured by the plurality of screens and including an object that is a display element arranged on the editing screen; a screen script generation unit to generate a screen script that is a processing program to be executed only when a specific screen out of the plurality of screens to be displayed on the programmable display device is displayed; a screen script storage unit to store the screen script generated by the screen script generation unit; and a management unit to manage an association between the object and the screen script. When the object is copied from a source editing screen to a destination editing screen, the screen script generation unit registers, with the destination editing screen, the screen script associated with the object to be copied.

Advantageous Effects of Invention

The drawing device according to the present invention can achieve the effect of improving the work efficiency for creating a plurality of screens that is displayed on a programmable display device.

DESCRIPTION OF EMBODIMENTS

Hereinafter, a drawing device, a drawing program, and a storage medium according to embodiments of the present invention will be described in detail with reference to the drawings. The present invention is not limited to the embodiments.

First Embodiment

Figure 1:
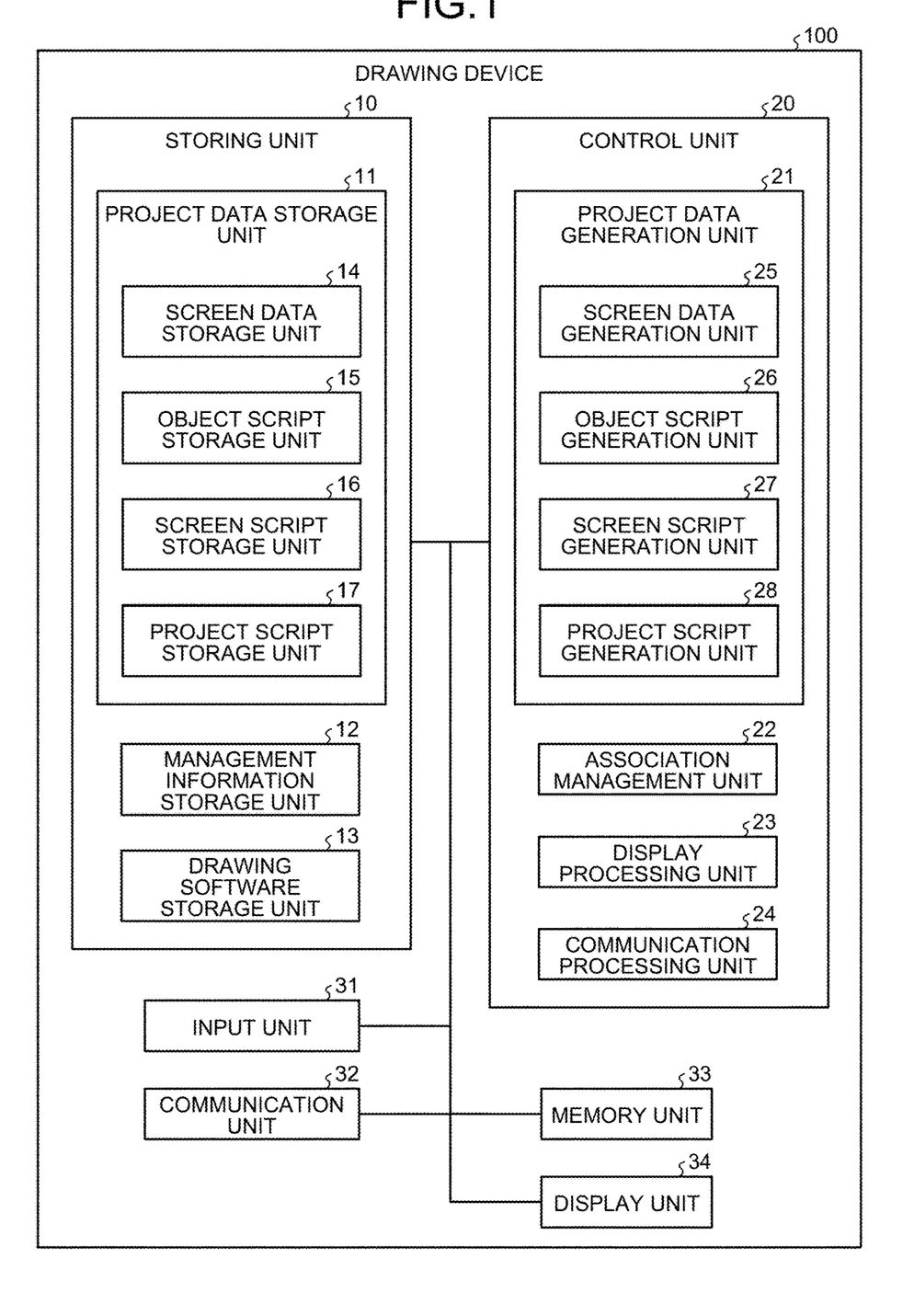
FIG. 1 is a block diagram illustrating a configuration of a drawing device according to a first embodiment of the present invention.
Figure 2:
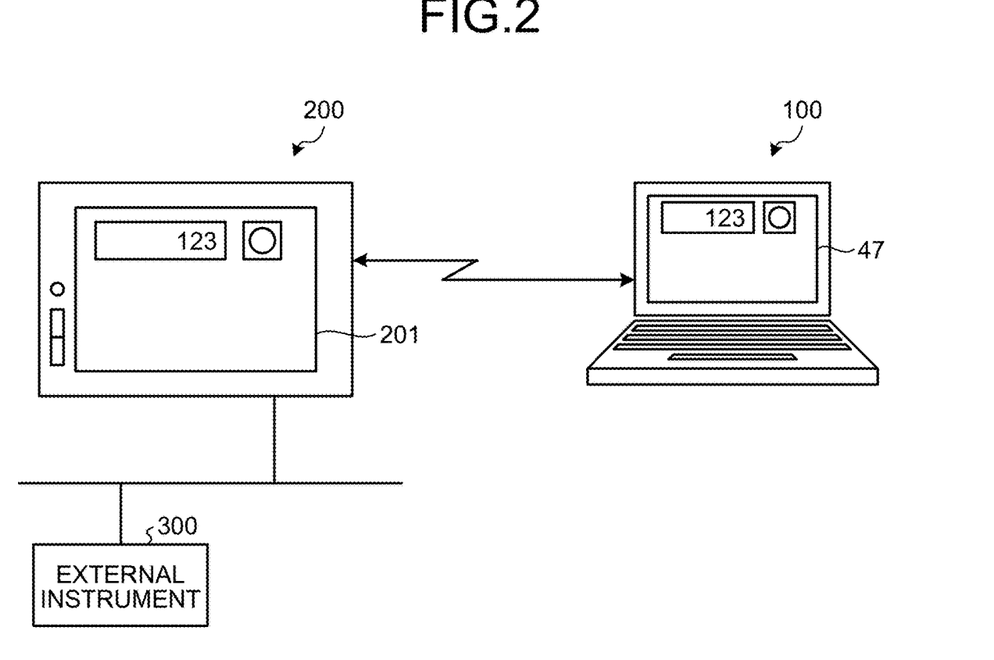
FIG. 2 is a diagram illustrating a system including the drawing device illustrated in FIG. 1.

FIG. 1 is a block diagram illustrating a configuration of a drawing device 100 according to the first embodiment of the present invention. FIG. 2 is a diagram illustrating a system including the drawing device 100 illustrated in FIG. 1. The system illustrated in FIG. 2 includes the drawing device 100, a programmable display device 200, and an external instrument 300. The external instrument 300 is a programmable logic controller (PLC).

The programmable display device 200 and the external instrument 300 are communicably connected to each other. The programmable display device 200 and the external instrument 300 are connected, for example, via a communication network using Ethernet (registered trademark). The programmable display device 200 and the external instrument 300 may be connected via a wireless communication network other than Ethernet or a wired communication network through RS-232, a universal serial bus (USB), or the like. Any number of external instruments 300 can be connected to the programmable display device 200.

The programmable display device 200 displays, on a monitor screen 201, information on the state of the external instrument 300. The programmable display device 200 also controls the external instrument 300 according to an input operation. The programmable display device 200 functions as a user interface of the external instrument 300.

The drawing device 100 is a computer with drawing software as a drawing program installed thereon. The drawing device 100 is communicably connected to the programmable display device 200 to create project data. The project data describe processing for controlling the display of a plurality of screens on the programmable display device 200. The project data include screen data, an object script, a screen script, and a project script as described later. The programmable display device 200 executes control such as switching of the screen displayed on the monitor screen 201 according to the processing described in the project data. The drawing software is software including a function of supporting creation of project data.

The drawing device 100 creates, based on a user operation, project data to be executed on the programmable display device 200 and sends the created project data to the programmable display device 200. The drawing device 100 also changes the project data read from the programmable display device 200 and sends the changed project data to the programmable display device 200.

The drawing device 100 includes a storing unit 10 which is a functional unit that stores various programs and various data, and a control unit 20 which is a functional unit that controls the entire drawing device 100. The drawing device 100 includes an input unit 31 which is a functional unit that receives an input operation from the user, a communication unit 32 which is a functional unit that communicates with the programmable display device 200, a memory unit 33 which is a volatile memory that functions as a work memory when the control unit 20 executes arithmetic processing, and a display unit 34 which is a functional unit that displays a screen. The storing unit 10, the control unit 20, the input unit 31, the communication unit 32, the memory unit 33, and the display unit 34 are communicably connected to one another.

The storing unit 10 includes a project data storage unit 11 which is a functional unit that stores project data, a management information storage unit 12 which is a functional unit that stores management information, and a drawing software storage unit 13 which is a functional unit that stores drawing software. Management information will be described later.

The project data storage unit 11 includes a screen data storage unit 14 which is a functional unit that stores screen data, an object script storage unit 15 which is a functional unit that stores an object script, a screen script storage unit 16 which is a functional unit that stores a screen script, and a project script storage unit 17 which is a functional unit that stores a project script.

Screen data are data configured by a plurality of screens to be displayed on the monitor screen 201, and include an object. An object is a display element arranged on an editing screen of the drawing device 100. One or more display elements can be arranged as objects. Examples of objects include display elements such as an analog meter, a lamp, and a button. When being displayed on the monitor screen 201 of the programmable display device 200, some objects are displayed on a screen displayed on the monitor screen 201, and others are not displayed on a screen displayed on the monitor screen 201, which are described later as script management objects. An object script is a processing program for executing a function set for an object. For each object, a function related to display, action, or operation is set by the corresponding object script according to the type of object. For example, for an object as a button, an object script which is a processing program for implementing the function related to button operation is set. The object script set for a specific object does not affect the functions of other objects, and only affects the specific object.

A screen script is a processing program that is executed only when a specific screen out of a plurality of screens displayable on the programmable display device 200 is displayed. A plurality of screen scripts is described so as to correspond one-to-one to a plurality of screens. A screen script is a processing program correlated with a screen that is displayed on the monitor screen 201 such that the screen script of a specific screen is executed in the programmable display device 200 only when the specific screen is displayed on the monitor screen 201 of the programmable display device 200 after project data including a plurality of editing screens created by the drawing device 100 are introduced to the programmable display device 200. More specifically, a screen script is a processing program for performing the process of operating a plurality of objects in conjunction with one another when the plurality of objects is present on one screen displayed on the monitor screen 201.

Project data include one or more project scripts. A project script is a processing program that is always valid regardless of any screen displayed on the monitor screen 201 of the programmable display device 200 while the power of the programmable display device 200 is on. A project script is exemplified by a processing program for turning on a warning light, which is another external instrument, when a communication failure is detected by checking the communication status between the external instrument 300 and the programmable display device 200. The warning light is not illustrated. The programmable display device 200 can set a screen script or a project script to implement processing that cannot be expressed only by an object script.

The control unit 20 includes a project data generation unit 21 which is a functional unit that generates project data, and an association management unit 22 which is a functional unit as a management unit that manages the association between objects and screen scripts. The association management unit 22 manages the association between objects and screen scripts. The control unit 20 includes a display processing unit 23 which is a functional unit that executes processing for display in the display unit 34, and a communication processing unit 24 which is a functional unit that executes processing for communication in the communication unit 32.

The project data generation unit 21 includes a screen data generation unit 25 which is a functional unit that generates screen data, an object script generation unit 26 which is a functional unit that generates an object script, a screen script generation unit 27 which is a functional unit that generates a screen script, and a project script generation unit 28 which is a functional unit that generates a project script.

Figure 3:
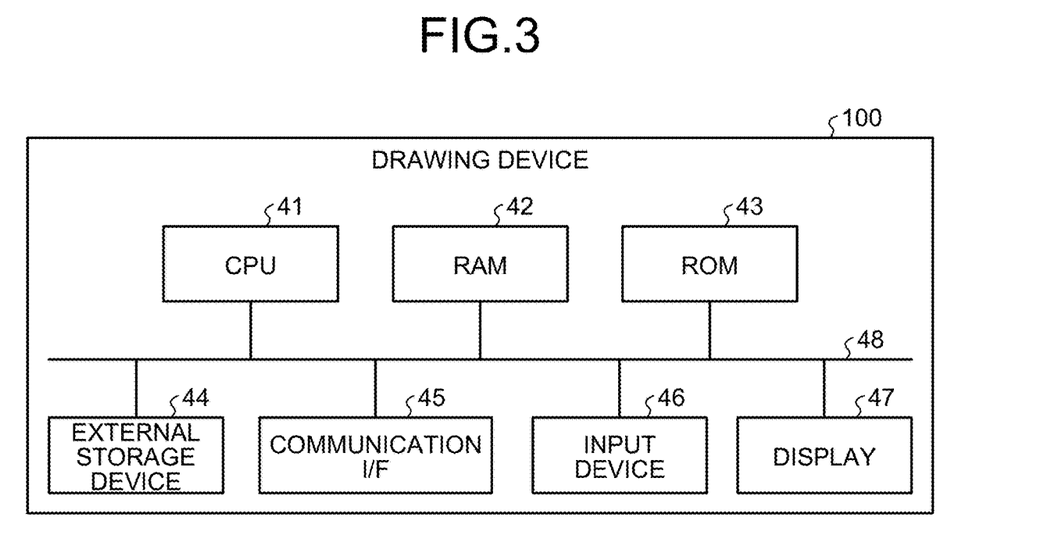
FIG. 3 is a diagram illustrating a hardware configuration of the drawing device illustrated in FIG. 1.

FIG. 3 is a diagram illustrating a hardware configuration of the drawing device 100 illustrated in FIG. 1. The drawing device 100, which is a computer with drawing software installed thereon, includes a central processing unit (CPU) 41 that executes various processes, a random access memory (RAM) 42 including a program storage area and a data storage area, a read only memory (ROM) 43 that is a non-volatile memory, and an external storage device 44 that stores data. The drawing device 100 further includes a communication interface (I/F) 45 that is an interface for connection with the programmable display device 200, an input device 46 that receives an input operation from the user, and a display 47 that displays information using various screens. The components of the drawing device 100 illustrated in FIG. 3 are connected to one another via a bus 48.

The input device 46 is a pointing device and a keyboard. The function of the input unit 31 illustrated in FIG. 1 is implemented using the input device 46. One example of the display 47 is a liquid crystal display with a liquid crystal panel. The function of the display unit 34 illustrated in FIG. 1 is implemented using the display 47. The function of the communication unit 32 illustrated in FIG. 1 is implemented using the communication I/F 45.

The CPU 41 executes programs stored in the ROM 43 and the external storage device 44. The function of the control unit 20 illustrated in FIG. 1 is implemented using the CPU 41. The external storage device 44 is a solid state drive (SSD) or a hard disk drive (HDD). The external storage device 44 stores drawing software, project data, and management information. The function of the storing unit 10 illustrated in FIG. 1 is implemented using the external storage device 44 and the ROM 43. The ROM 43 stores a basic input/output system (BIOS) or a unified extensible firmware interface (UEFI), which is a program for controlling the basic operation of the computer, namely the drawing device 100.

The programs stored in the ROM 43 and the external storage device 44 are loaded into the RAM 42, which is the memory unit 33 illustrated in FIG. 1. The CPU 41 develops the programs in the program storage area in the RAM 42 to execute various processes.

Drawing software may be recorded on a storage medium readable by a computer. The drawing device 100 may store, in the external storage device 44, the drawing software recorded on the storage medium. The storage medium may be a portable storage medium which is a flexible disk or a flash memory which is a semiconductor memory. Drawing software may be installed on the drawing device 100 from another computer or a server device via a communication network.

Next, creation of project data by the drawing device 100 will be described. The user operates the input unit 31 to select an object and arrange the selected object on an editing screen. The screen data generation unit 25 generates screen data including information on the selected object and the position where the object is arranged. The screen data storage unit 14 stores screen data including a plurality of screens that is displayed on the monitor screen 201.

The object script generation unit 26 generates an object script that is set for an object arranged on an editing screen. The display unit 34 displays an object script screen for setting an object script. The user operates the input unit 31 to input a character string representing an object script on the object script screen. The object script generation unit 26 generates an object script as a processing program in response to the input of the character string on the object script screen. The object script storage unit 15 stores a plurality of object scripts compiled for each screen that is displayed on the monitor screen 201. Note that the object script screen will be described later.

The screen script generation unit 27 generates a screen script that is set for a screen. The display unit 34 displays a common script screen that is used for setting a screen script and setting a project script. The user operates the input unit 31 to input a character string representing a screen script on the common script screen. The screen script generation unit 27 generates a screen script as a processing program in response to the input of the character string on the common script screen.

The project script generation unit 28 generates a project script that is set for project data. The user operates the input unit 31 to input a character string representing a project script on the common script screen. The project script generation unit 28 generates a project script as a processing program in response to the input of the character string on the common script screen. In the first embodiment, the common script screen is not illustrated. The common script screen is similar to an object script screen 60 illustrated in FIG. 5 (described later). The drawing device 100 does not necessarily set a screen script and a project script on the common script screen, and may set a screen script and a project script on separate script creation screens.

Next, the function of the association management unit 22 illustrated in FIG. 1 and management information will be described. The association management unit 22 generates management information for screen scripts generated by the screen script generation unit 27. Management information is information indicating the association between objects and screen scripts. The management information generated by the association management unit 22 is registered with the drawing device 100 by being stored in the management information storage unit 12.

Figure 4:
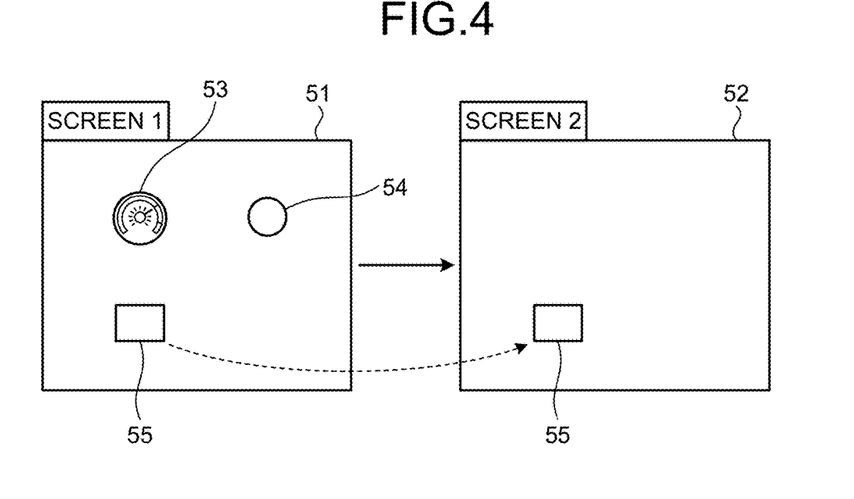
FIG. 4 is a diagram for explaining the operation of the drawing device illustrated in FIG. 1 in which an object is copied by a screen data generation unit provided in the drawing device.

FIG. 4 is a diagram for explaining the operation of the drawing device 100 illustrated in FIG. 1 in which an object is copied by the screen data generation unit 25 provided in the drawing device 100. FIG. 4 illustrates how an object is copied from a source editing screen 51 to a destination editing screen 52. The editing screen 51 is the editing screen corresponding to "screen 1", which is one of the screens that are displayed on the monitor screen 201. On the editing screen 51, three objects are arranged: an analog meter 53, a lamp 54, and a button 55.

Figure 5:
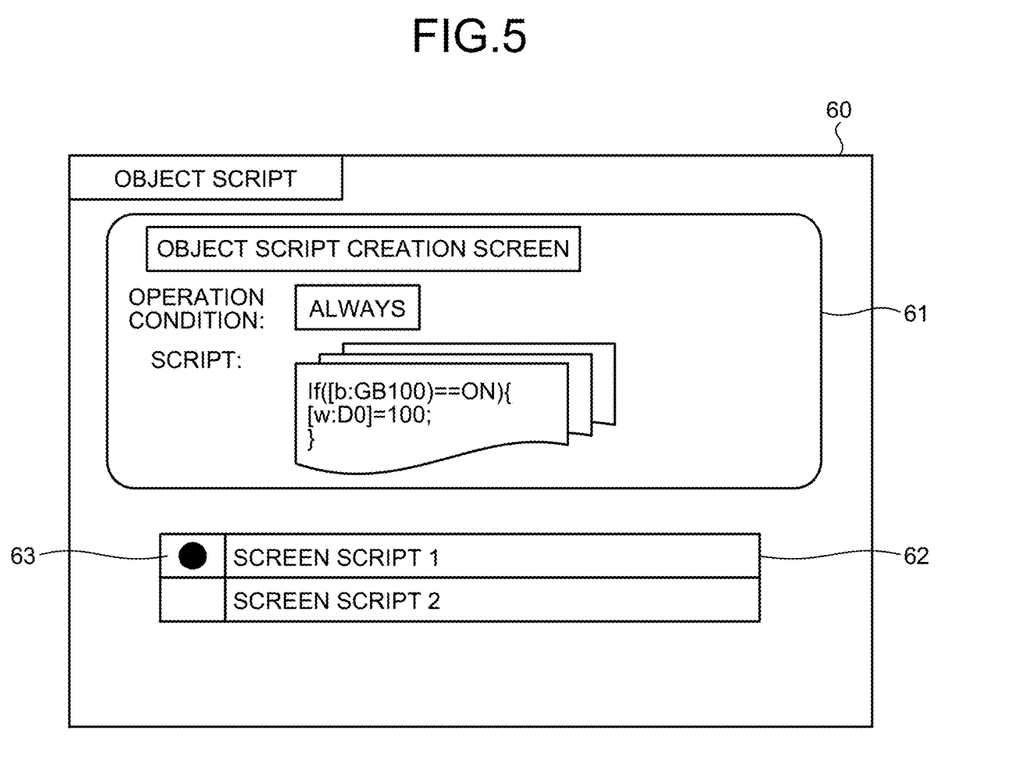
FIG. 5 is a diagram illustrating an example of an object script screen for a button which is one of the objects illustrated in FIG. 4.

FIG. 5 is a diagram illustrating an example of the object script screen 60 for the button 55, which is one of the objects illustrated in FIG. 4. The object script screen 60 is displayed on the display unit 34 in response to an operation on the input unit 31 that positions the cursor to the button 55 on the editing screen 51 and clicks the button 55. The object script screen 60 includes a creation screen 61 including input fields for creating an object script. The creation screen 61 includes an input field for setting the operation condition of an object script and an input field for inputting the character string of an object script.

In addition to the creation screen 61, the object script screen 60 includes a display field 62 for displaying the name of a screen script registered as being associated with the button 55. The display field 62 displays "screen script 1" and "screen script 2", which are the names of two screen scripts registered as being associated with the button 55. "Screen script 1" and "screen script 2" are screen scripts set for "screen 1", and are generated by the screen script generation unit 27. The display processing unit 23 displays the names "screen script 1" and "screen script 2" in the display field 62 of the object script screen 60 by referring to the management information stored in the management information storage unit 12.

The display field 62 includes an input field 63 for setting selection and non-selection for each screen script whose name is displayed in the display field 62. The association management unit 22 receives, in the input field 63, selection of a screen script to be copied along with the object from the source editing screen 51 to the destination editing screen 52. In this manner, the display unit 34 displays, on the object script screen 60, the input field 63 as a field for receiving selection of a screen script to be copied.

The user can switch between selection and non-selection for each screen script by operating the input unit 31 to move the cursor to the input field 63 and click the input field 63. In the example illustrated in FIG. 5, the black circle displayed in the box of the input field 63 next to the name "screen script 1" indicates "selection". The box of the input field 63 next to the name "screen script 2" is blank, indicating "non-selection". The state of the input field 63 illustrated in FIG. 5 indicates that "screen script 1" is selected to be copied along with the object from the source editing screen 51 to the destination editing screen 52, and "screen script 2" is not selected to be copied along with the object from the source editing screen 51 to the destination editing screen 52.

Suppose that the screen data generation unit 25 copies the button 55 from the editing screen 51 to the editing screen 52 in response to a user operation. The editing screen 52 is the editing screen corresponding to "screen 2". "Screen 2" is one of the screens that are displayed on the monitor screen 201 other than "screen 1". "Screen 1" and "screen 2" may be screens of the same piece of project data or screens of different pieces of project data.

When the button 55 is copied between "screen 1" and "screen 2", the association management unit 22 refers to the management information stored in the management information storage unit 12 and recognizes the screen scripts for "screen 1" registered as being associated with the button 55. The association management unit 22 searches the screen script storage unit 16 for "screen script 1" selected by the association management unit 22 from among the screen scripts registered as being associated with the button 55, and reads "screen script 1". The screen script generation unit 27 sets "screen script 1" retrieved by the association management unit 22 for "screen 2", thereby registering "screen script 1" from "screen 1" to "screen 2".

In this manner, when the screen data generation unit 25 copies an object from the source editing screen 51 to the destination editing screen 52, the association management unit 22 searches the screen script storage unit 16 for screen scripts registered as being associated with the object to be copied. The screen script generation unit 27 registers, with the destination editing screen 52, the screen script selected by the association management unit 22 from among the screen scripts registered as being associated with the object to be copied.

The drawing device 100 registers "screen script 1" set for "screen 1" with "screen 2" while copying the button 55 from "screen 1" to "screen 2". The drawing device 100 can also copy and register, to "screen 2" along with the button 55, the procedure for the operation by "screen script 1" linked to the operation that is based on the function of the button 55 on "screen 1". The drawing device 100 can save the trouble of creating the same "screen script 1" for "screen 1" and "screen 2". By managing the association between objects and screen scripts in the association management unit 22, the drawing device 100 can search for and read, without manual operation, screen scripts registered as being associated with the object to be copied.

The drawing device 100 allows the association management unit 22 to select a screen script to be copied along with the object from the source editing screen 51 to the destination editing screen 52, so that the drawing device 100 can copy the desired one of the screen scripts registered as being associated with the object. The user can select a screen script to be copied in advance on the object script screen 60, so that the user can avoid forgetting to set the screen script for the editing screen 52 to which the object is copied.

Figure 6:
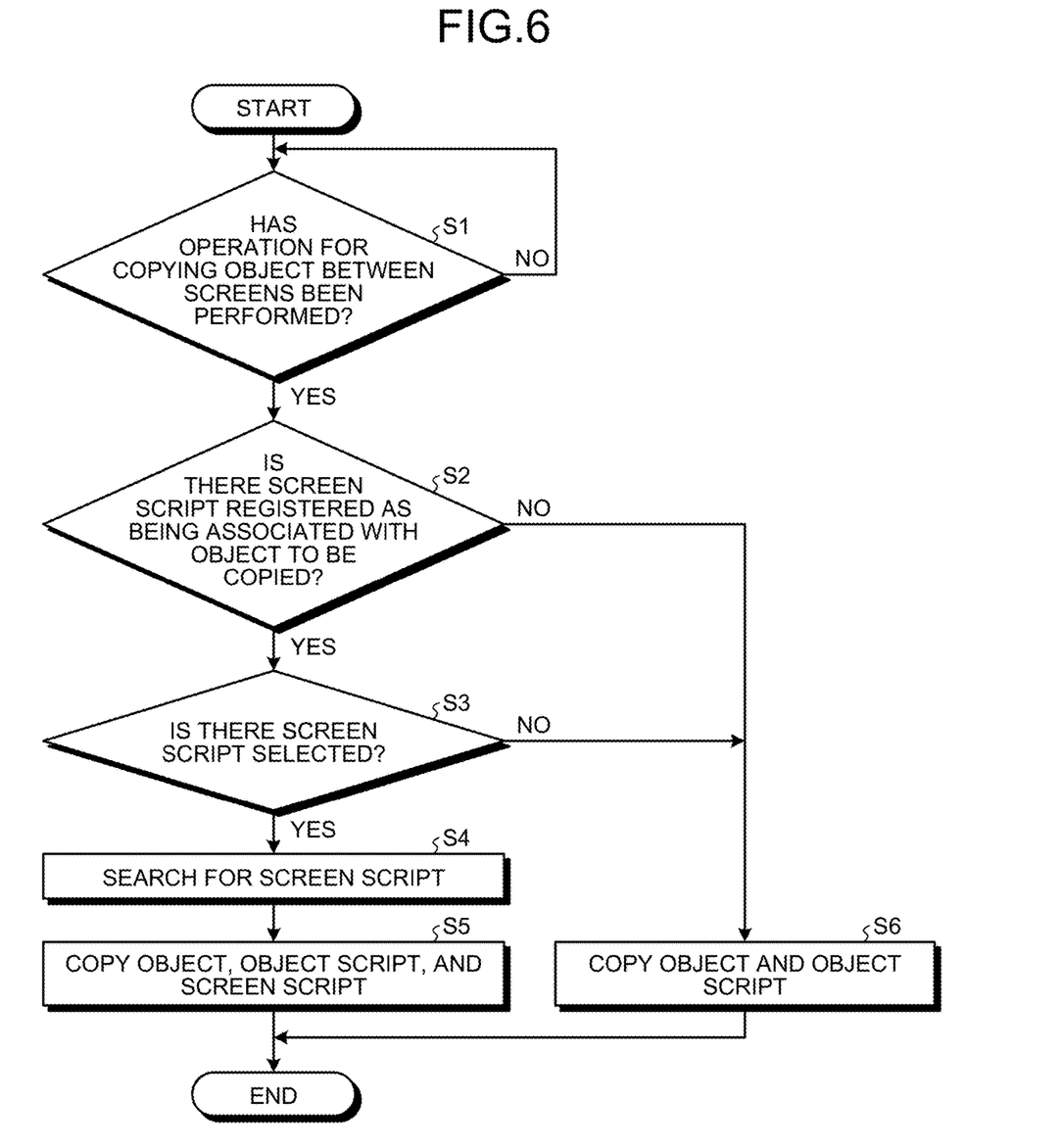
FIG. 6 is a flowchart illustrating an operation procedure by the drawing device illustrated in FIG. 1.

FIG. 6 is a flowchart illustrating an operation procedure by the drawing device 100 illustrated in FIG. 1. In step S1, the screen data generation unit 25 determines whether an operation for copying an object between screens, that is, an operation for copying an object from the editing screen 51 to the editing screen 52, has been performed. If no operation for copying an object from the editing screen 51 to the editing screen 52 has been performed (step S1: No), the screen data generation unit 25 returns the procedure to step S1.

In response to an operation for copying an object from the editing screen 51 to the editing screen 52 (step S1: Yes), in step S2, the association management unit 22 refers to the management information stored in the project script storage unit 17, and determines whether there is a screen script registered as being associated with the object to be copied. When there is a screen script registered as being associated with the object (step S2: Yes), in step S3, the association management unit 22 determines whether there is a screen script registered as being associated with the object and also selected to be copied along with the object.

When there is a screen script selected to be copied (step S3: Yes), in step S4, the association management unit 22 searches for and reads the selected screen script from the screen script storage unit 16. In step S5, the screen data generation unit 25 registers the object with the destination editing screen 52 by copying the object from the source editing screen 51. The object script generation unit 26 registers the object script accompanying the object with the destination editing screen 52 by copying from the source editing screen 51. The screen script generation unit 27 registers the screen script with the destination editing screen 52 by setting the screen script read in step S5 for the destination editing screen 52.

When there is no screen script registered as being associated with the object (step S2: No), and when there is no screen script selected to be copied (step S3: No), in step S6, the screen data generation unit 25 registers the object with the destination editing screen 52 by copying the object from the source editing screen 51. The object script generation unit 26 registers the object script accompanying the object with the destination editing screen 52 by copying from the editing screen 51 to the editing screen 52. The screen script generation unit 27 does not copy any screen script from the editing screen 51 to the editing screen 52. Thus, the drawing device 100 ends the operation procedure illustrated in FIG. 6.

According to the first embodiment, the drawing device 100 manages the association between objects and screen scripts in the association management unit 22, so that the drawing device 100 can search for and read screen scripts registered as being associated with the object to be copied. The drawing device 100 can copy a screen script along with the object, so that the drawing device 100 can save the trouble of creating the same screen script for each editing screen, and can set, without manual operation, the screen script for the editing screen to which the object is copied. Accordingly, the drawing device 100 can achieve the effect of improving the work efficiency for creating a plurality of screens that is displayed on the monitor screen 201 of the programmable display device 200.

Second Embodiment

Figure 7:
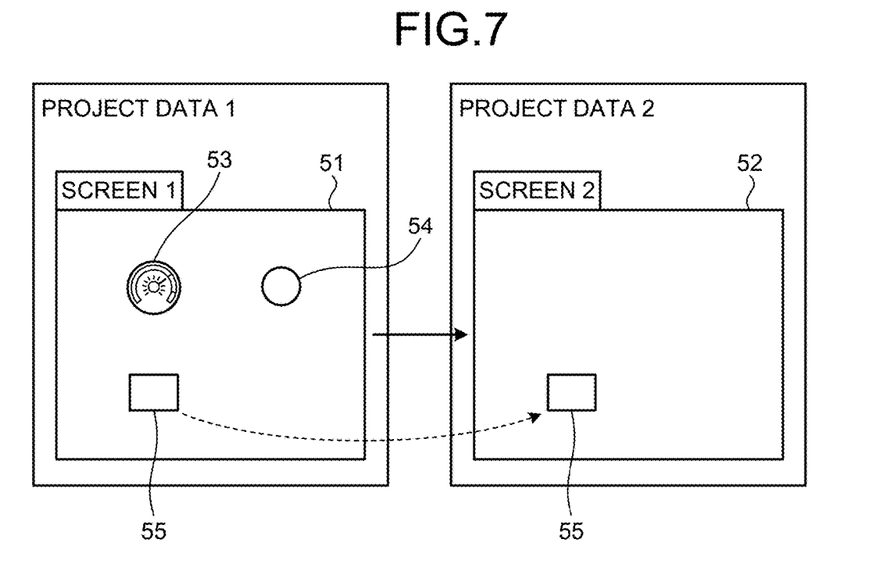
FIG. 7 is a diagram for explaining the operation of a drawing device according to a second embodiment of the present invention.

FIG. 7 is a diagram for explaining the operation of the drawing device 100 according to the second embodiment of the present invention. In the second embodiment, the association management unit 22 manages the association between objects and screen scripts and the association between objects and project scripts. The drawing device 100 according to the second embodiment has a configuration similar to the configuration of the drawing device 100 according to the first embodiment. In the second embodiment, components identical to those in the first embodiment are denoted by the same reference signs, and configuration differences from the first embodiment will be mainly described.

The association management unit 22 manages the association between objects and project scripts. Management information is information indicating the association between objects and screen scripts as in the first embodiment and the association between objects and project scripts. The management information generated by the association management unit 22 is registered with the drawing device 100 by being stored in the management information storage unit 12.

FIG. 7 illustrates how an object is copied from the editing screen 51 to the editing screen 52 in different pieces of project data. "Screen 1" is one of the screens that are displayed on the monitor screen 201 in the processing with "project data 1" which is one piece of project data.

Figure 8:
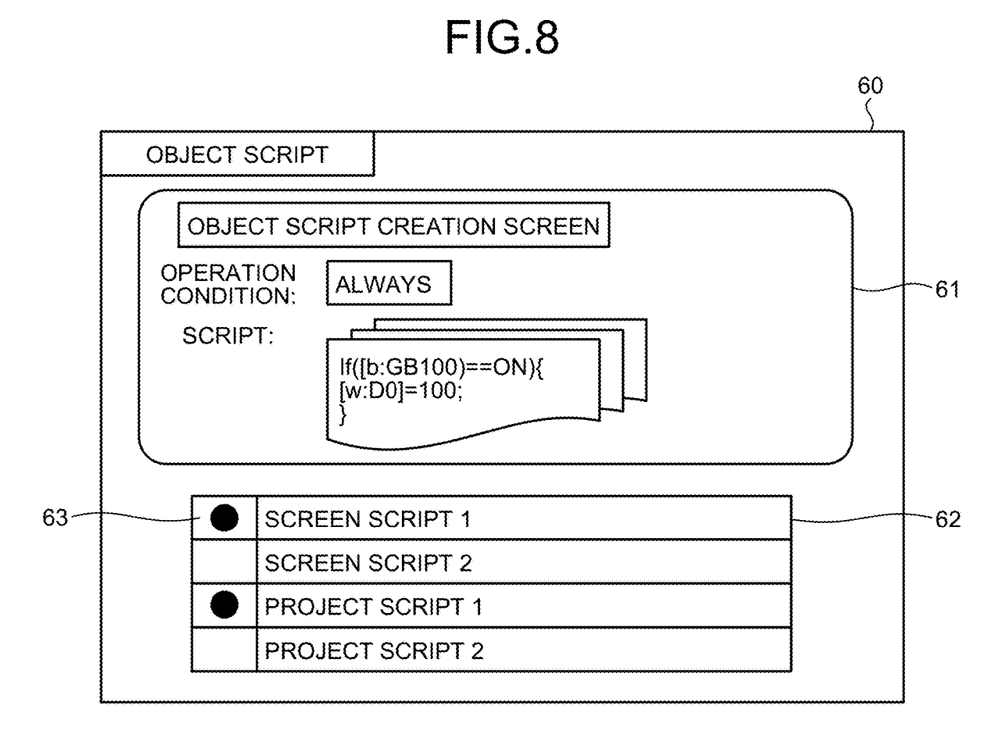
FIG. 8 is a diagram illustrating an example of an object script screen for a button which is one of the objects illustrated in FIG. 7.

FIG. 8 is a diagram illustrating an example of the object script screen 60 for the button 55, which is one of the objects illustrated in FIG. 7. The display field 62 displays "screen script 1" and "screen script 2", which are the names of two screen scripts registered as being associated with the button 55. Further, the display field 62 displays "project script 1" and "project script 2", which are the names of two project scripts registered as being associated with the button 55.

"Project script 1" and "project script 2" are project scripts set for "project data 1", and are generated by the project script generation unit 28. The display processing unit 23 displays the names "screen script 1", "screen script 2", "project script 1", and "project script 2" in the display field 62 of the object script screen 60 by referring to the management information stored in the management information storage unit 12.

The display field 62 includes the input field 63 for setting selection and non-selection for each screen script and each project script whose name is displayed in the display field 62. The association management unit 22 receives, in the input field 63, selection of a screen script and a project script to be copied along with the object from the editing screen 51 to the editing screen 52. In this manner, the display unit 34 displays, on the object script screen 60, the input field 63 as a field for receiving selection of a screen script and a project script to be copied.

The state of the input field 63 illustrated in FIG. 8 indicates that "screen script 1" and "project script 1" are selected to be copied along with the object from the editing screen 51 to the editing screen 52, and "screen script 2" and "project script 2" are not selected to be copied along with the object from the editing screen 51 to the editing screen 52.

When the button 55 is copied from "screen 1" to "screen 2", the association management unit 22 refers to the management information stored in the management information storage unit 12 and recognizes the screen scripts and project scripts for "screen 1" registered as being associated with the button 55. The association management unit 22 searches the screen script storage unit 16 for "screen script 1" selected by the association management unit 22 from among the screen scripts registered as being associated with the button 55, and reads "screen script 1". The association management unit 22 also searches the project script storage unit 17 for "project script 1" selected by the association management unit 22 from among the project scripts registered as being associated with the button 55, and reads "project script 1".

The project script generation unit 28 sets "project script 1" searched and read by the association management unit 22 for "screen 2", thereby registering "project script 1" from "screen 1" to "screen 2". The screen script generation unit 27 registers "screen script 1" from "screen 1" to "screen 2" as in the first embodiment.

In this manner, when the screen data generation unit 25 copies an object from the editing screen 51 to the editing screen 52, the association management unit 22 searches the screen script storage unit 16 for screen scripts registered as being associated with the object to be copied. The association management unit 22 also searches the project script storage unit 17 for project scripts registered as being associated with the object to be copied. The project script generation unit 28 copies, from the editing screen 51, the project script selected by the association management unit 22 from among the project scripts registered as being associated with the object to be copied, thereby registering the project script with the editing screen 52 of the project data that is different from the project data including the editing screen 51.

By managing the association between objects and screen scripts and the association between objects and project scripts in the association management unit 22, the drawing device 100 can search for and read, without manual operation, screen scripts and project scripts registered as being associated with the object to be copied.

The drawing device 100 allows the association management unit 22 to select a project script to be copied along with the object from the editing screen 51 of one piece of project data, so that the drawing device 100 can copy, to the editing screen 52 of another piece of project data, any one of the project scripts registered as being associated with the object. The user can select a screen script and a project script to be copied in advance on the object script screen 60, so that the user can avoid forgetting to set the screen script and the project script for the editing screen 52 to which the object is copied.

Figure 9:
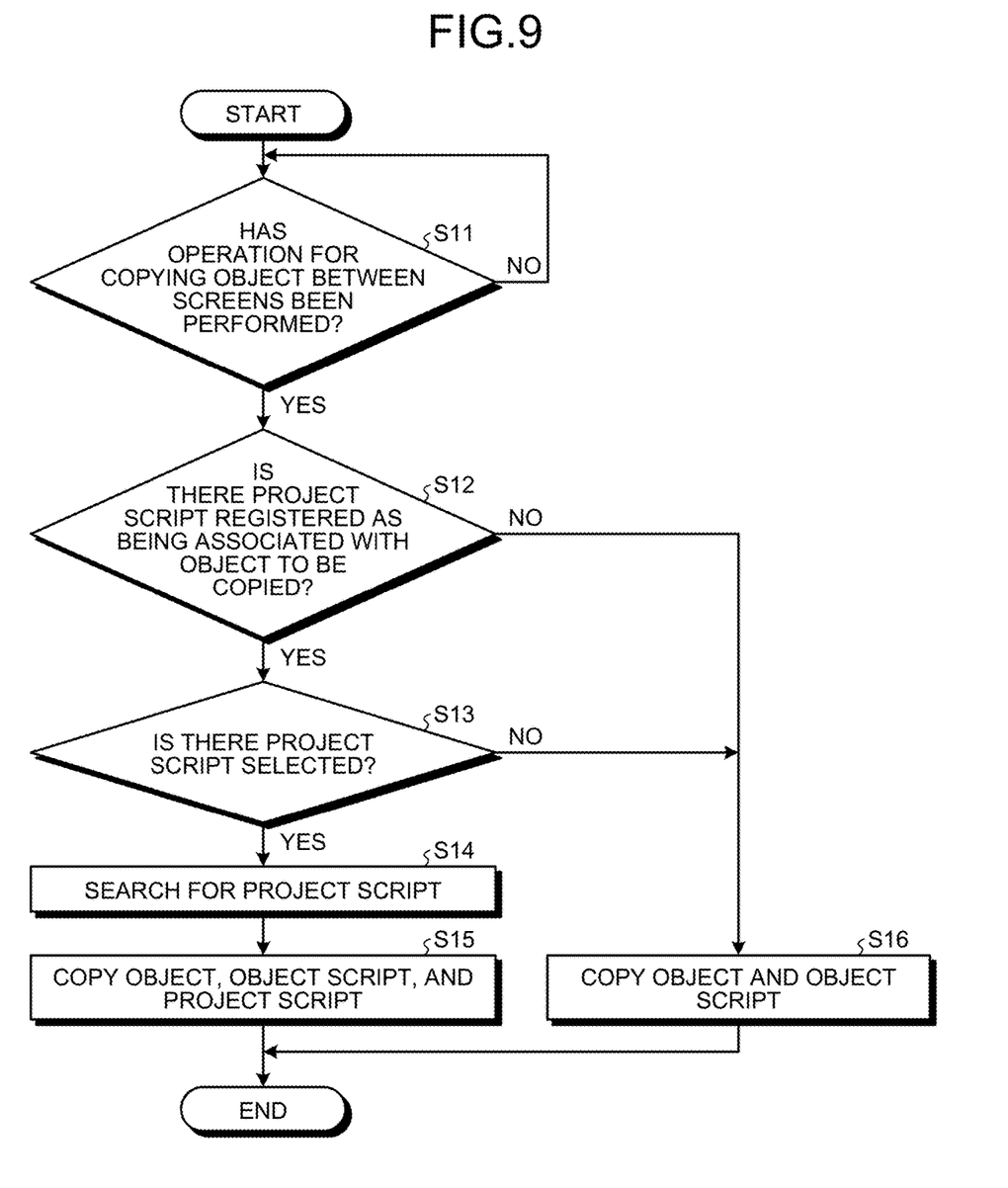
FIG. 9 is a flowchart illustrating an operation procedure by the drawing device according to the second embodiment.

FIG. 9 is a flowchart illustrating an operation procedure by the drawing device 100 according to the second embodiment. The drawing device 100 implements the operation procedure illustrated in FIG. 9 in addition to the operation procedure illustrated in FIG. 6. In step S11, the screen data generation unit 25 determines whether an operation for copying an object between screens of different pieces of project data, that is, an operation for copying an object from the editing screen 51 of one piece of project data to the editing screen 52 of another piece of project data, has been performed. If no operation for copying an object from the editing screen 51 to the editing screen 52 has been performed (step S11: No), the screen data generation unit 25 returns the procedure to step S11.

In response to an operation for copying an object from the editing screen 51 to the editing screen 52 (step S11: Yes), in step S12, the association management unit 22 refers to the management information stored in the project script storage unit 17, and determines whether there is a project script registered as being associated with the object to be copied. When there is a project script registered as being associated with the object (step S12: Yes), in step S13, the association management unit 22 determines whether there is a project script registered as being associated with the object and also selected to be copied along with the object.

When there is a project script selected to be copied (step S13: Yes), in step S14, the association management unit 22 searches for and reads the selected project script from the project script storage unit 17. In step S15, the screen data generation unit 25 registers the object with the destination editing screen 52 by copying the object from the source editing screen 51. The object script generation unit 26 registers the object script accompanying the object with the destination editing screen 52 by copying from the editing screen 51 to the editing screen 52. The project script generation unit 28 registers the project script with the destination editing screen 52 by setting the project script read in step S14 for the destination screen.

When there is no project script registered as being associated with the object (step S12: No), and when there is no project script selected to be copied (step S13: No), in step S16, the screen data generation unit 25 registers the object with the destination editing screen 52 by copying the object from the source editing screen 51. The object script generation unit 26 registers the object script accompanying the object with the destination editing screen 52 by copying from the editing screen 51 to the editing screen 52. The project script generation unit 28 does not copy any project script from the editing screen 51 to the editing screen 52. Thus, the drawing device 100 ends the operation procedure illustrated in FIG. 9.

According to the second embodiment, the drawing device 100 manages the association between objects and screen scripts and the association between objects and project scripts in the association management unit 22, so that the drawing device 100 can search for and read screen scripts and project scripts registered as being associated with the object to be copied. The drawing device 100 can copy a screen script and a project script along with the object, so that the drawing device 100 can save the trouble of creating the same screen script and the same project script for each screen, and can set, without manual operation, the screen script and the project script for the destination of the object. Accordingly, the drawing device 100 can achieve the effect of improving the work efficiency for creating a plurality of screens that is displayed on the monitor screen 201 of the programmable display device 200.

Third Embodiment

Figure 10:
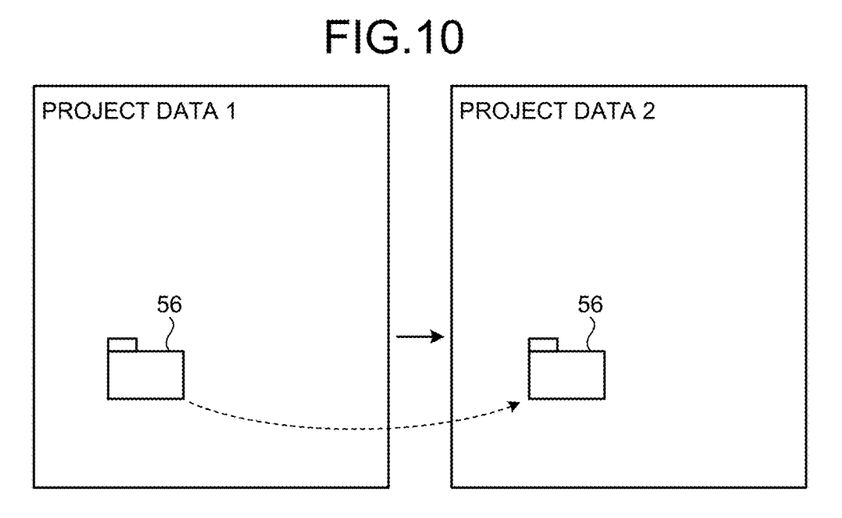
FIG. 10 is a diagram for explaining the operation of a drawing device according to a third embodiment of the present invention.

FIG. 10 is a diagram for explaining the operation of the drawing device 100 according to the third embodiment of the present invention. In the third embodiment, the association management unit 22 manages the association between screens and project scripts. The drawing device 100 according to the third embodiment has a configuration similar to the configuration of the drawing device 100 according to the first embodiment. In the third embodiment, components identical to those in the first and second embodiments are denoted by the same reference signs, and configuration differences from the first and second embodiments will be mainly described.

The association management unit 22 manages the association between screens and project scripts. Management information is information indicating the association between editing screens and project scripts. The management information generated by the association management unit 22 is registered with the drawing device 100 by being stored in the management information storage unit 12.

FIG. 10 illustrates how an editing screen is copied from "project data 1" to "project data 2" that are different pieces of project data. An editing screen 56 is an editing screen that is open for the screens included in "project data 1". When copying the editing screen, the display unit 34 displays a script management screen. The display unit 34 may display a script management screen in response to an operation on the editing screen 56 for "project data 1".

Figure 11:
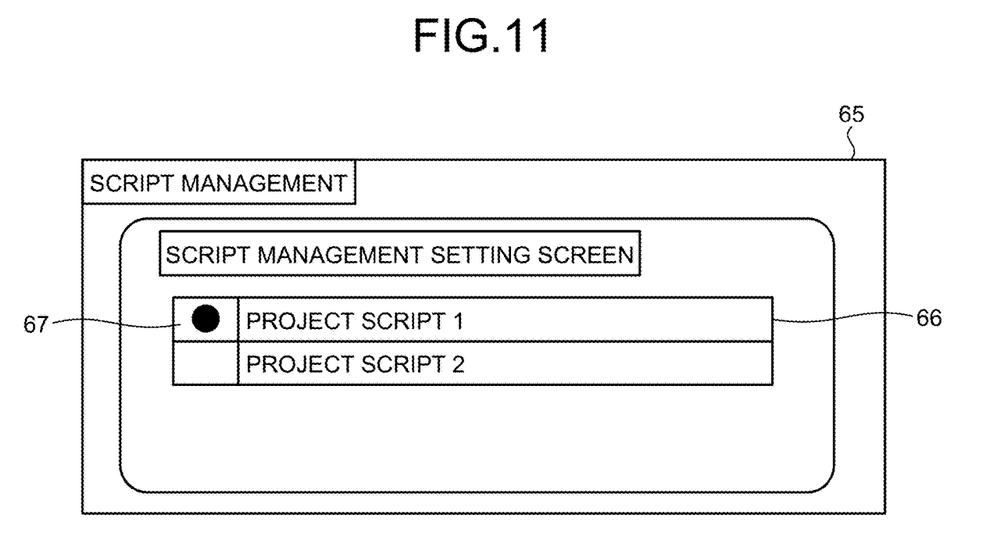
FIG. 11 is a diagram illustrating an example of a script management screen displayed on a display unit of the drawing device according to the third embodiment.

FIG. 11 is a diagram illustrating an example of a script management screen 65 displayed on the display unit 34 of the drawing device 100 according to the third embodiment. The drawing device 100 displays, on the script management screen 65, the association between editing screens and project scripts by the association management unit 22.

The script management screen 65 includes a display field 66 for displaying the name of a project script registered as being associated with the editing screen. The display field 66 displays "project script 1" and "project script 2", which are the names of two project scripts registered as being associated with the editing screen 56. "Project script 1" and "project script 2" are project scripts set for "project data 1", and are generated by the project script generation unit 28. The display processing unit 23 displays the names "project script 1" and "project script 2" in the display field 66 of the script management screen 65 by referring to the management information stored in the management information storage unit 12.

The display field 66 includes an input field 67 for setting selection and non-selection for each project script whose name is displayed in the display field 66. The association management unit 22 receives, in the input field 67, selection of a project script to be copied along with the editing screen between the different pieces of project data. In this manner, the display unit 34 displays, on the script management screen 65, the input field 67 as a field for receiving selection of a project script to be copied.

The state of the input field 67 illustrated in FIG. 11 indicates that "project script 1" is selected to be copied along with the editing screen from "project data 1" to "project data 2", and "project script 2" is not selected to be copied along with the editing screen from "project data 1" to "project data 2".

The association management unit 22 refers to the management information stored in the management information storage unit 12 and recognizes the project scripts registered as being associated with the editing screen 56 of "project data 1". The association management unit 22 searches the project script storage unit 17 for "project script 1" selected by the association management unit 22 from among the project scripts registered as being associated with the editing screen 56, and reads "project script 1". The project script generation unit 28 sets "project script 1" searched and read by the association management unit 22 for "project data 2", thereby copying "project script 1" from "project data 1" to "project data 2".

In this manner, when an editing screen is copied between different pieces of project data, the association management unit 22 searches the project script storage unit 17 for project scripts registered as being associated with the editing screen to be copied. The project script generation unit 28 copies, between the different pieces of project data, the project script selected by the association management unit 22 from among the project scripts registered as being associated with the editing screen to be copied.

By managing the association between editing screens and project scripts in the association management unit 22, the drawing device 100 can search for and read, without manual operation, project scripts registered as being associated with the editing screen to be copied. The drawing device 100 allows the association management unit 22 to select a project script to be copied along with the editing screen between the different pieces of project data, so that the drawing device 100 can copy the desired one of the project scripts registered as being associated with the editing screen. The user can select a project script to be copied in advance on the script management screen 65, so that the user can avoid forgetting to set the project script for the project data to which the editing screen is copied.

According to the third embodiment, the drawing device 100 manages the association between editing screens and project scripts in the association management unit 22, so that the drawing device 100 can search for and read project scripts registered as being associated with the editing screen to be copied. The drawing device 100 can copy a project script along with the editing screen, so that the drawing device 100 can save the trouble of creating the same project script for a plurality of pieces of project data, and can set, without manual operation, the project script for the destination of the editing screen. Accordingly, the drawing device 100 can achieve the effect of improving the work efficiency for creating a plurality of screens that is displayed on the monitor screen 201 of the programmable display device 200.

Fourth Embodiment

Figure 12:
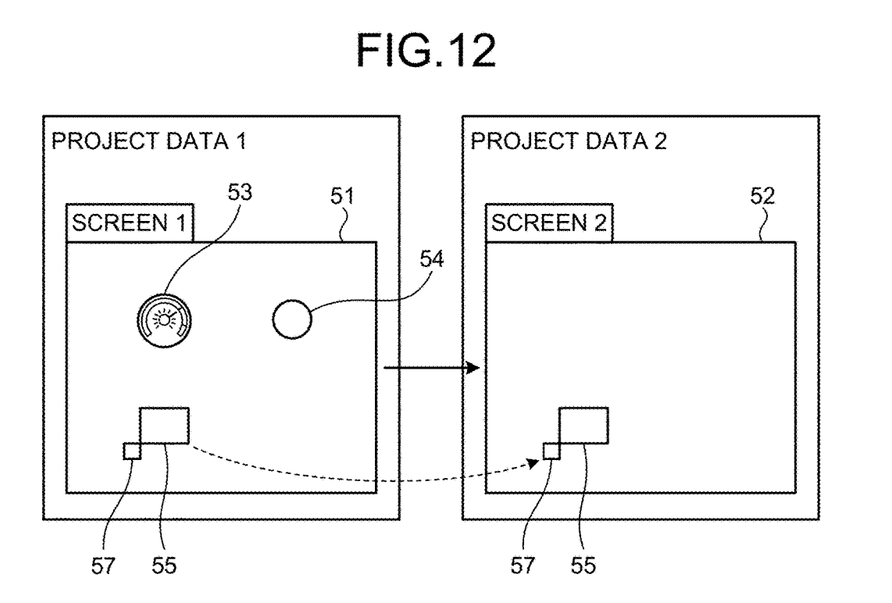
FIG. 12 is a diagram for explaining the operation of a drawing device according to a fourth embodiment of the present invention.

FIG. 12 is a diagram for explaining the operation of the drawing device 100 according to the fourth embodiment of the present invention. In the fourth embodiment, the drawing device 100 displays a script management screen in which object scripts, screen scripts, and project scripts can be collectively managed, where the screen scripts and project scripts are registered as being associated with objects. In the fourth embodiment, components identical to those in the first to third embodiments are denoted by the same reference signs, and configuration differences from the first to third embodiments will be mainly described.

Management information is information indicating the association between objects and screen scripts and the association between objects and project scripts, as in the second embodiment. FIG. 12 illustrates how an object is copied from the editing screen 51 to the editing screen 52 in different pieces of project data.

The display unit 34 displays a script management object 57 on the editing screen 51. The script management object 57 is an object indicating the existence of management information for managing at least one of an object script, a screen script, and a project script, where the screen script and the project script are registered in association with an object having a function such as the button 55. The script management object 57 illustrated in FIG. 12 is displayed by being attached to the button 55. In the example illustrated in FIG. 12, the script management object 57 and the button 55 are correlated by being in contact with each other. Alternatively, the script management object 57 and the button 55 may be correlated by overlapping each other. The script management object 57 is superimposed on the editing screen 51 so that the script management object 57 is correlated with the editing screen 51. The script management object 57 is displayed when there is registered management information indicating the association between the button 55, and screen and project scripts. Note that the script management object 57 is visibly displayed on the display unit 34 of the drawing device 100. When the project data are introduced from the drawing device 100 to the programmable display device 200 and the programmable display device 200 executes the project data, the script management object 57 is not displayed on the monitor screen 201 of the programmable display device 200. Comparing the editing screen 51 with the monitor screen 201, the script management object 57 on the monitor screen 201 appears as if it became transparent and visually unrecognizable.

Figure 13:
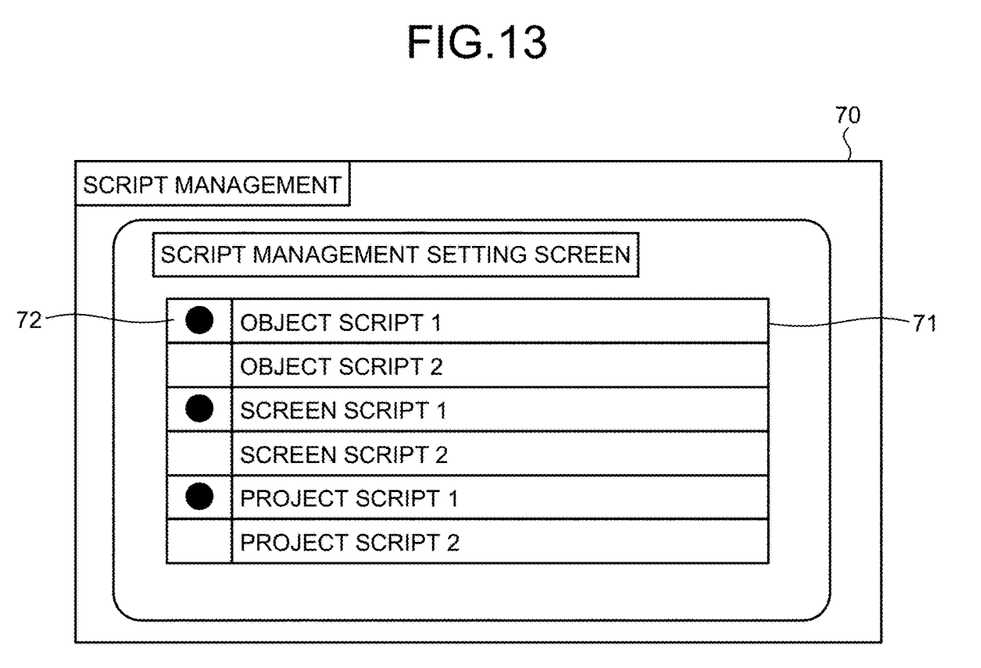
FIG. 13 is a diagram illustrating an example of a script management screen displayed on a display unit of the drawing device according to the fourth embodiment.

FIG. 13 is a diagram illustrating an example of a script management screen 70 displayed on the display unit 34 of the drawing device 100 according to the fourth embodiment. The script management screen 70 is displayed on the display unit 34 in response to an operation that positions the cursor to the script management object 57 on the editing screen 51 and clicks the script management object 57. The drawing device 100 can easily display the script management screen 70 in response to an operation on the script management object 57 displayed on the editing screen 51. Because the script management object 57 is displayed by being attached to the button 55, it can be easily recognized that the script management screen 70 displayed in response to an operation on the script management object 57 is the script management screen 70 for the button 55.

The script management screen 70 includes a display field 71 for displaying the names of a screen script and a project script registered as being associated with the button 55 in "screen 1" and the names of object scripts accompanying the button 55. The display field 71 displays the names of all the scripts related to the button 55 in "screen 1". The display field 71 displays "screen script 1", "screen script 2", "project script 1", and "project script 2" in the same manner as the display field 62 of the second embodiment, and also displays "object script 1" and "object script 2", which are the names of object scripts.

The display field 71 includes an input field 72 for setting selection and non-selection for each object script, each screen script, and each project script whose name is displayed in the display field 71. In this manner, the display unit 34 displays, in response to an operation on the script management object 57, the script management screen 70 including the input field 72 for receiving selection of an object script, a screen script, and a project script to be copied based on the management information.

The state of the input field 72 illustrated in FIG. 13 indicates that "object script 1", "screen script 1", and "project script 1" are selected to be copied along with the object from "screen 1" to "screen 2", and "object script 2", "screen script 2", and "project script 2" are not selected to be copied along with the object from "screen 1" to "screen 2". On the script management screen 70, because all the scripts related to the button 55 in "screen 1" can be subjected to selection as to whether these scripts should be copied, all the scripts can be collectively managed.

The object script generation unit 26 copies "object script 1" from "screen 1" to "screen 2" and does not copy "object script 2" from "screen 1" to "screen 2".

The screen script generation unit 27 copies "screen script 1" from "screen 1" to "screen 2" as in the second embodiment. The project script generation unit 28 copies "project script 1" from "screen 1" to "screen 2" as in the second embodiment.

The drawing device 100 can copy a desired screen script and a desired project script out of the screen scripts and project scripts registered as being associated with the copy target. The drawing device 100 can also copy any one of the object scripts. On the common script management screen 70, the drawing device 100 can collectively subject the object scripts, screen scripts, and project scripts to selection as to whether these scripts should be copied.

The drawing device 100 according to the fourth embodiment can also achieve the effect of improving the work efficiency for creating a plurality of screens that is displayed on the monitor screen 201 of the programmable display device 200.

In the configuration described in the fourth embodiment, the script management object 57 and the button 55 are correlated by being in contact with each other, and the script management object 57 is superimposed on the editing screen 51 so that the script management object 57 is correlated with the editing screen 51. Alternatively, the script management object 57 and the button 55 may be uncorrelated by keeping away from each other, and the script management object 57 may be superimposed on the editing screen 51 so that the script management object 57 is correlated only with the editing screen 51. In this case, one or both of a screen script and a project script correlated with the editing screen 51 are registered with the script management object 57. Then, when the script management object 57 is copied from "screen 1" to "screen 2", one or both of a screen script and a project script correlated with the editing screen 51 and registered with the script management object 57 are copied to "screen 2".

The configurations described in the above-mentioned embodiments indicate examples of the contents of the present invention. The configurations can be combined with another well-known technique, and some of the configurations can be omitted or changed in a range not departing from the gist of the present invention.

REFERENCE SIGNS LIST

10 storing unit; 11 project data storage unit; 12 management information storage unit; 13 drawing software storage unit; 14 screen data storage unit; 15 object script storage unit; 16 screen script storage unit; 17 project script storage unit; 20 control unit; 21 project data generation unit; 22 association management unit; 23 display processing unit; 24 communication processing unit; 25 screen data generation unit; 26 object script generation unit; 27 screen script generation unit; 28 project script generation unit; 31 input unit; 32 communication unit; 33 memory unit; 34 display unit; 41 CPU; 42 RAM; 43 ROM; 44 external storage device; 45 communication I/F; 46 input device; 47 display; 51, 52, 56 editing screen; 53 analog meter; 54 lamp; 55 button; 57 script management object; 60 object script screen; 61 creation screen; 62, 66, 71 display field; 63, 67, 72 input field; 65, 70 script management screen; 100 drawing device; 200 programmable display device; 201 monitor screen; 300 external instrument

The invention claimed is:

1. A drawing device comprising:
   a display to display an editing screen for creating a plurality of screens to be displayed on a programmable display device;
   a processor; and
   a memory to store a program which, when executed by the processor, performs processes of:
   generating screen data configured by the plurality of screens and including an object that is a display element arranged on the editing screen;
   generating a screen script that is a processing program to be executed only when a specific screen out of the plurality of screens to be displayed on the programmable display device is displayed; and
   managing an association between the object and the screen script, wherein the memory stores the screen script generated, and
   when the object is copied from a source editing screen to a destination editing screen, registering, with the destination editing screen, the screen script associated with the object to be copied,
   the processor generates a project script that is a processing program to be valid regardless of any screen displayed on the programmable display device while a power of the programmable display device is on, and
   when the object is copied from the source editing screen to the destination editing screen, the processor registers, with the destination editing screen, the project script associated with the object to be copied.

2. The drawing device according to claim 1, wherein the processor receives selection of the screen script to be copied, and
   copies the screen script registered as being associated with the object to be copied and also selected.

3. The drawing device according to claim 1, wherein
the memory stores the project script generated, and
the processor manages an association between the object and the project script.

4. The drawing device according to claim 3, wherein when the object is copied from the source editing screen to the destination editing screen, the processor registers, with the destination editing screen, the project script registered as being associated with the object to be copied.

5. The drawing device according to claim 4, wherein
the processor receives selection of the project script to be copied, and
the processor copies the project script registered as being associated with the object to be copied and also selected.

6. The drawing device according to claim 5, wherein the display displays an object script creation screen for creating an object script that is a processing program for executing a function set for the object, and also displays, on the object script creation screen, a field for receiving selection of the screen script and the project script to be copied.

7. The drawing device according to claim 5, wherein
the display displays a script management screen for displaying an object script that is a processing program for executing a function set for the object, and the screen script and the project script which are registered as being associated with the object, and
the script management screen includes a field for receiving selection of the object script, the screen script, and the project script to be copied.

8. The drawing device according to claim 7, wherein
the object includes a script management object for managing at least one of the object script, the screen script, and the project script, and
the display displays the script management screen in response to an operation on the script management object displayed on the editing screen.

9. The drawing device according to claim 8, wherein the script management object is displayed on the editing screen and is not displayed on a screen displayed on the programmable display device.

10. A drawing device comprising:
a display to display an editing screen for creating a plurality of screens to be displayed on a programmable display device;
a processor; and
a memory to store a program which, when executed by the processor, performs processes of:
generating screen data configured by the plurality of screens and including an object that is a display element arranged on the editing screen;
generating a project script that is a processing program to be valid regardless of any screen displayed on the programmable display device while a power of the programmable display device is on; and
managing an association between the object and the project script, wherein
the memory stores the project script generated; and
when the object is copied from a source editing screen to a destination editing screen, the processor registers, with the destination editing screen, the project script associated with the object to be copied.

11. A drawing device comprising:
a display to display an editing screen for creating a plurality of screens to be displayed on a programmable display device;
a processor; and
a memory to store a program which, when executed by the processor, performs processes of:
generating screen data configured by the plurality of screens and including an object that is a display element arranged on the editing screen;
generating a project script that is a processing program to be valid regardless of any screen displayed on the programmable display device while a power of the programmable display device is on; and
managing an association between the editing screen and the project script, wherein
when the editing screen is copied from source project data to destination project data, the source project data and the destination project data each describing processing for controlling display of the plurality of screens, the processor registers, with the destination project data, the project script associated with the editing screen to be copied.

12. The drawing device according to claim 11, wherein
the processor receives selection of the project script to be copied, and
the processor copies the project script registered as being associated with the editing screen to be copied and also selected.

13. A non-transitory storage medium readable by a computer to store a drawing program to cause the computer to function as a drawing device, the drawing program causing the computer to execute:
displaying an editing screen for creating a plurality of screens to be displayed on a programmable display device;
generating screen data configured by the plurality of screens and including an object that is a display element arranged on the editing screen;
generating a screen script that is a processing program to be executed only when a specific screen out of the plurality of screens to be displayed on the programmable display device is displayed;
generating a project script that is a processing program to be valid regardless of any screen displayed on the programmable display device while a power of the programmable display device is on;
registering and managing association between the object and the project script; and
registering, when the object is copied from a source editing screen to a destination editing screen, the project script associated with the object to be copied with the destination editing screen.

14. The non-transitory storage medium according to claim 13, wherein the drawing program further causes the computer to execute:
registering and managing association between the object and the screen script; and
registering, when the object is copied from the source editing screen to the destination editing screen, the screen script associated with the object to be copied with the destination editing screen.

* * * * *